(12) United States Patent
Takizawa et al.

(10) Patent No.: US 9,265,387 B2
(45) Date of Patent: Feb. 23, 2016

(54) ELECTRIC INCINERATING TOILET BOWL AND INCINERATION CONTROL METHOD FOR ELECTRIC INCINERATING TOILET BOWL

(75) Inventors: Makoto Takizawa, Yokohama (JP); Yuko Takizawa, Yokohama (JP); Mayu Saita, Yokohama (JP); Keiko Takizawa, Hachioji (JP)

(73) Assignee: Dirac Inc., Yokohama-shi (JP)

( * ) Notice: Subject to any disclaimer, the term of this patent is extended or adjusted under 35 U.S.C. 154(b) by 0 days.

(21) Appl. No.: 13/641,756

(22) PCT Filed: Feb. 14, 2011

(86) PCT No.: PCT/JP2011/052992
§ 371 (c)(1),
(2), (4) Date: Oct. 24, 2012

(87) PCT Pub. No.: WO2011/132449
PCT Pub. Date: Oct. 27, 2011

(65) Prior Publication Data
US 2013/0031707 A1    Feb. 7, 2013

(30) Foreign Application Priority Data
Apr. 21, 2010   (JP) .................................. 2010-097853

(51) Int. Cl.
*A47K 11/02*   (2006.01)
*F23G 5/10*    (2006.01)
*C02F 11/06*   (2006.01)

(52) U.S. Cl.
CPC ................ *A47K 11/023* (2013.01); *F23G 5/10* (2013.01); *C02F 11/06* (2013.01); *C02F 2303/02* (2013.01); *Y02W 10/40* (2015.05)

(58) Field of Classification Search
CPC ................................ A47K 11/023; F23G 5/10
USPC ..................... 4/111.1, 111.2, 111.5, DIG. 17; 110/250, 346
See application file for complete search history.

(56) References Cited

U.S. PATENT DOCUMENTS 2,279,578 A * 4/1942 Martin ................. A47K 11/023
                                                  219/217
2,855,494 A * 10/1958 Kuebler ..................... F23G 5/10
                                                  110/191

(Continued)

FOREIGN PATENT DOCUMENTS

DE         10246578 A1    4/2004
JP         50-142372 U    11/1975

(Continued)

OTHER PUBLICATIONS

Machine Translation for JP 10-248750 A.*

(Continued)

*Primary Examiner* — Lauren Crane
*Assistant Examiner* — Erin Deery
(74) *Attorney, Agent, or Firm* — Locke Lord LLP; James E. Armstrong, IV; Brian S. Matross

(57) ABSTRACT

The present invention provides an electric incinerating toilet bowl and an incineration control method for the electric incinerating toilet bowl which can remove not only odor components but also smoke and soot generated when paper liners burn to thereby prevent the odor components and the smoke and soot from being exhausted. The incineration control method heats a smoke and soot removing filler layer to a smoke and soot removing temperature not lower than 350° C. by actuating a filler heating heater in response to input of a treatment start signal, carries out an incineration treatment by actuating an incinerating heater and an exhaust blower when a temperature of the smoke and soot removing filler layer has risen to a smoke and soot removing temperature, stops the incinerating heater and the filler heating heater when a temperature of an incineration chamber rises to a preset incineration treatment end temperature, and stops the exhaust blower when a temperature in the electric incinerating toilet bowl has dropped to a preset exhaust end temperature after the stop of the incinerating heater.

19 Claims, 3 Drawing Sheets

(56) References Cited

U.S. PATENT DOCUMENTS

| | | | |
|---|---|---|---|
| 3,068,812 A | 12/1962 | Hemeon | |
| 3,169,497 A * | 2/1965 | Blankenship | A47K 11/023 4/111.2 |
| 3,486,174 A | 12/1969 | Nordstedt et al. | |
| 4,036,152 A * | 7/1977 | Bright | 110/191 |
| 4,495,873 A | 1/1985 | Blankenship | |
| 4,823,408 A | 4/1989 | Blankenship | |
| 5,337,422 A * | 8/1994 | Blankenship | A47K 11/023 4/111.5 |

FOREIGN PATENT DOCUMENTS

| | | | |
|---|---|---|---|
| JP | 2-500820 A | 3/1990 | |
| JP | 04-236928 A | 8/1992 | |
| JP | 05-337061 A | 12/1993 | |
| JP | 06-261841 A | 9/1994 | |
| JP | 09-154768 A | 6/1997 | |
| JP | 10-248750 A * | 9/1998 | |
| SE | GB 1163614 A * | 9/1969 | A47K 11/023 |

OTHER PUBLICATIONS

Machine Translation for JP 09-154768.*
Machine Translation for JP 05-337061 A.*
International Search Report dated Mar. 22, 2011, issued for PCT/JP2011/052992.
European Search Report issued Jan. 8, 2014 for PCT/JP2011052992.

* cited by examiner

ELECTRIC INCINERATING TOILET BOWL AND INCINERATION CONTROL METHOD FOR ELECTRIC INCINERATING TOILET BOWL

TECHNICAL FIELD

The present invention relates to an electric incinerating toilet bowl and an incineration control method for the electric incinerating toilet bowl and particularly to an electric incinerating toilet bowl for deodorizing and sterilizing excrement by an incineration treatment and an incineration control method for the electric incinerating toilet bowl to control the incineration treatment of the excrement in the electric incinerating toilet bowl.

BACKGROUND ART

As a toilet bowl installed in a place without water supply and sewerage systems, there is a known electric incinerating toilet bowl in which excrement dropped with paper liners into an incineration chamber of an incinerator disposed below a toilet seat is incinerated by heating by an incinerating heater, the excrement and the paper liners are turned into odorless and sterile mineral incinerated ash, and odor components in burning exhaust gas generated in the incineration, e.g., nitrogen compounds such as ammonia are removed by a deodorizing catalyst. Although this electric incinerating toilet bowl is more expensive than a storage toilet bowl which is often used in a general temporary toilet, the stored excrement need not be transported to a treatment facility and treated and therefore the electric incinerating toilet bowl is sanitary, suitable for toilets installed in construction sites in urbanization areas, camp sites, training yards, outdoor sports facilities, and underground construction spaces, and best suitable for toilets installed in overcrowded spaces such as basements and shield tunnel construction sites where people are living or working (see Patent Document 1, for example).

CITATION LIST

Patent Document

Patent Document 1: Japanese Patent Application Laid-Open No. 4-236928

SUMMARY OF THE INVENTION

Problem to be Solved by the Invention

In such an electric incinerating toilet bowl, when it is used much more frequently than expected, the paper liners dropped in the incineration chamber may burn furiously with flame due to heating by the incinerating heater. Smoke and soot and a smell of burned paper generated when the paper liners burn furiously cannot be satisfactorily removed by the deodorizing catalyst and therefore the burning exhaust gas including the smoke and soot is exhausted outside to pollute the environment, if the paper liners burn.

If the use frequency of the electric incinerating toilet bowl is excessively high, a transient time period for which water vapor, a tarry substance, and the smoke and soot exist together inside the incinerator becomes long during the incineration treatment and may take up most of the incineration treatment time. Although the water vapor, the tarry substance, and the smoke and soot in the incinerator are drawn into an exhaust blower with the burning exhaust gas and exhausted outside from an exhaust port, condensation of moisture occurs and deposition of the smoke and soot and the tarry substance occurs in a toilet bowl housing, if the transient time period is long. If they occur in terminals of temperature detectors or a current controller, they may cause electrical failures.

Therefore, it is an object of the present invention to provide an electric incinerating toilet bowl and an incineration control method for the electric incinerating toilet bowl which can remove not only odor components but also smoke and soot generated when paper liners burn, which can prevent the odor components and the smoke and soot from being exhausted outside the toilet bowl, and which can prevent occurrence of an electrical failure due to the smoke and soot.

Means for Solving the Problem

To achieve the object, an electric incinerating toilet bowl according to the present invention includes: a flushing bowl provided below a toilet seat and having a bottom which can be opened and closed; an incineration chamber provided below the flushing bowl; an incinerating heater for heating and incinerating excrement dropped from the flushing bowl into the incineration chamber with a paper liner and the paper liner; and an exhaust blower for exhausting burning exhaust gas generated in the incineration chamber outside from the incineration chamber through an exhaust route. A deodorizing catalyst filled portion filled with a deodorizing catalyst for coming in contact, at a temperature lower than 350° C., with the burning exhaust gas to thereby remove odor components included in the burning exhaust gas, a smoke and soot removing filler filled portion filled with a smoke and soot removing filler for coming in contact, at a temperature not lower than 350° C., with the burning exhaust gas to thereby remove smoke and soot included in the burning exhaust gas, and a filler heating heater for heating the smoke and soot removing filler are provided in the exhaust route.

Furthermore, in the electric incinerating toilet bowl according to the invention, the smoke and soot removing filler filled portion has a length in a range of 5 to 50 cm in a gas flowing direction and a sectional area in a range of 50 to 200 $cm^2$.

An incineration control method for the electric incinerating toilet bowl according to the invention is the incineration control method for the electric incinerating toilet bowl and includes the steps of: heating the smoke and soot removing filler to a preset smoke and soot removing temperature not lower than 350° C. by actuating the filler heating heater in response to input of a treatment start signal; carrying out an incineration treatment by actuating the incinerating heater and the exhaust blower when the temperature of the smoke and soot removing filler has risen to the smoke and soot removing temperature; stopping the incinerating heater and the filler heating heater when the bottom face temperature of the incineration chamber has risen to a preset incineration treatment end temperature; and stopping the exhaust blower when a temperature in the electric incinerating toilet bowl has dropped to a preset exhaust end temperature after the stop of the incinerating heater.

Moreover, in the incineration control method for the electric incinerating toilet bowl according to the invention, each of the incinerating heater and the filler heating heater stops operation when a time from the start of the operation has exceeded a preset time required to burn the maximum amount of excrement which is accommodated in the incineration chamber. A surface temperature of the incinerating heater is controlled in a range of 500 to 600° C. The incineration treatment end temperature is set in a range of 100 to 250° C.

Effect of the Invention

With the electric incinerating toilet bowl according to the invention, it is possible to remove the odor components in the burning exhaust gas by the deodorizing catalyst having a temperature lower than 350° C., and to remove the smoke and soot included in the burning exhaust gas by the smoke and soot removing filler having a temperature not lower than 350° C. With the incineration control method for the electric incinerating toilet bowl according to the invention, the incinerating heater and the exhaust blower are actuated after the smoke and soot removing filler has been heated to 350° C. or higher and therefore the smoke and soot removing filler can reliably remove the smoke and soot.

MODE FOR CARRYING OUT THE INVENTION

Figure 1:
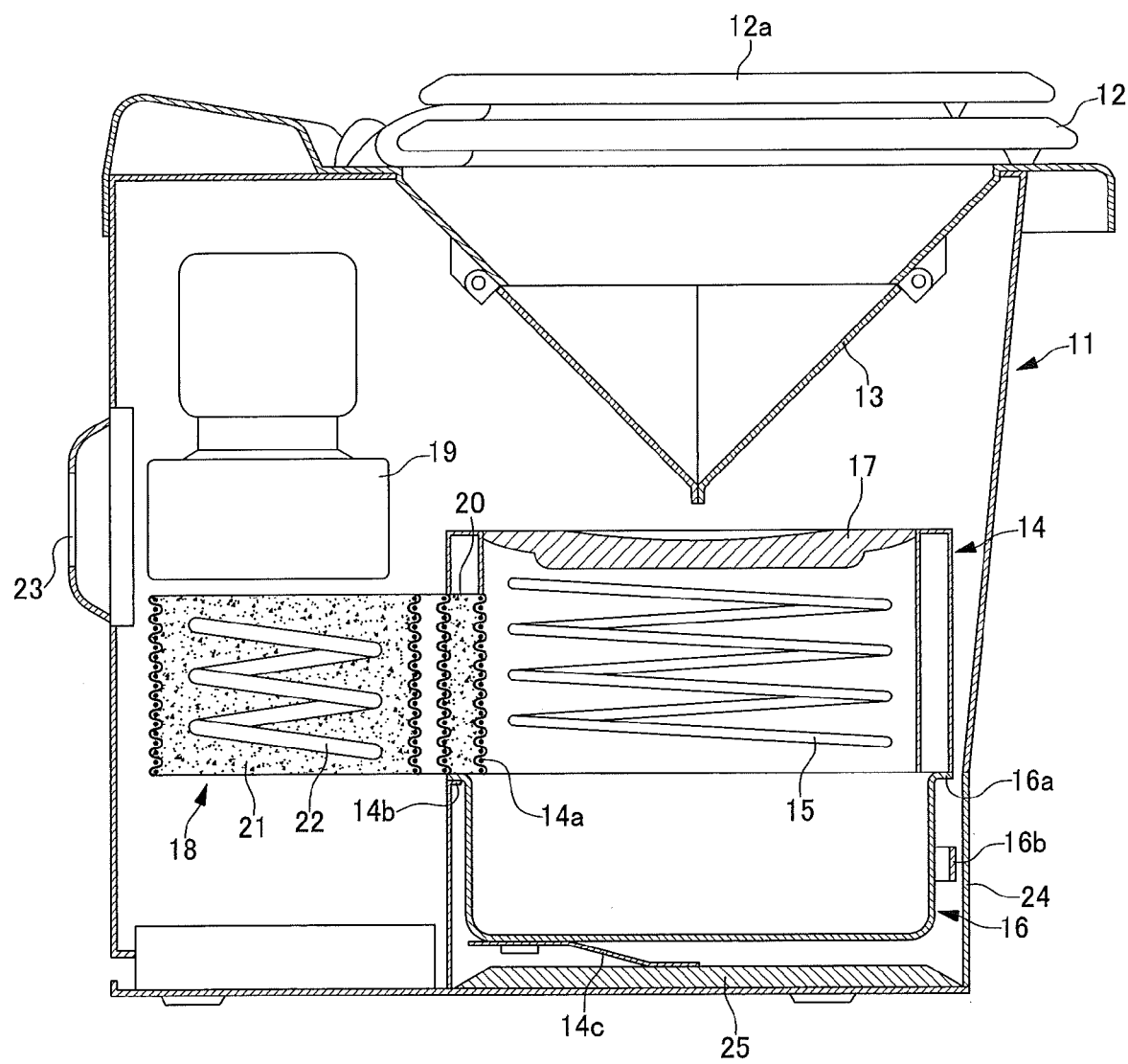
FIG. 1 is a sectional view showing an embodiment of an electric incinerating toilet bowl.
Figure 2:
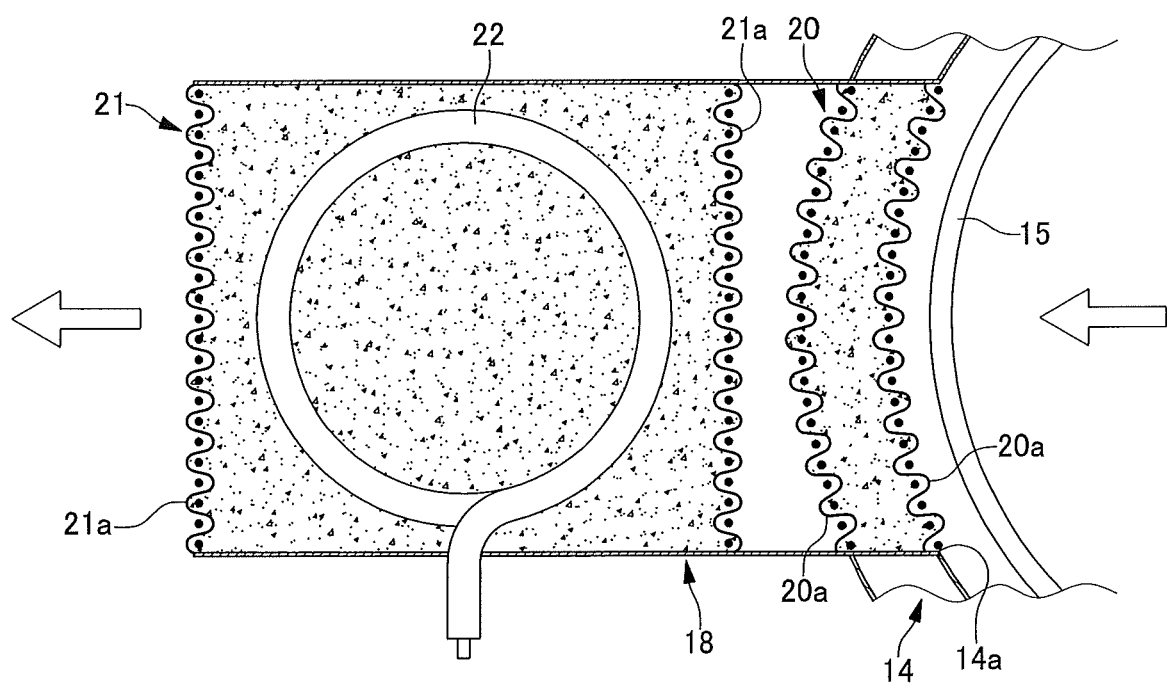
FIG. 2 is a sectional view of a deodorizing catalyst layer and a smoke and soot removing filler layer.

An electric incinerating toilet bowl includes a toilet seat 12 provided to an upper portion of a toilet bowl housing 11, a flushing bowl 13 provided to be adjacent to a lower portion of the toilet seat 12, a double-walled incinerator 14 provided below the flushing bowl 13, a helical incinerating heater 15 disposed in an upper cylindrical portion of the incinerator 14, a bottomed cylindrical incineration chamber 16 which can be put into and taken out of a lower half-cylindrical portion of the incinerator 14, an incinerator cover 17 for covering an upper opening of the incinerator 14 so that it can be opened and closed, an exhaust route 18 provided to be adjacent to an opening 14a provided on a back side of an upper portion of the incinerator 14, an exhaust blower 19 for drawing in burning exhaust gas out of the incinerator 14 through the exhaust route 18, a deodorizing catalyst filled portion 20 and a smoke and soot removing filler filled portion 21 provided to the exhaust route 18, and a filler heating heater 22 for heating a smoke and soot removing filler filled in the smoke and soot removing filler filled portion 21.

Furthermore, an exhaust port 23 for exhausting the burning exhaust gas drawn in by the exhaust blower 19 outside is provided to a back face of the toilet bowl housing 11 and a chamber taking-in/out port 24 for taking out and in the incineration chamber 16 is provided to a lower portion of a front face of the toilet bowl housing 11. A pedal to be operated after use, an inspection opening, and the like (not shown) are provided to a side face of the toilet bowl housing 11. A heat insulating portion 25 filled with heat-resistant glass wool or the like is provided to a bottom face of the toilet bowl housing 11 in order to suppress heat transfer to a floor surface where the electric incinerating toilet bowl is installed. The incineration chamber 16 has a suitable heat insulating structure such as a double structure and has such a structure and a shape as to be easily taken in/out through the chamber taking-in/out port 24.

The incineration chamber 16 is retained in a predetermined position by locking a flange portion 16a, which is provided to an outer periphery of an upper portion of the incineration chamber 16, to a lock lug 14b provided to an inner periphery of an upper portion of the lower half-cylindrical portion of the incinerator 14, by biasing the incineration chamber 16 upward by a leaf spring 14c provided to a bottom plate of the incinerator 14 and retaining it with the upper opening of the incineration chamber in close contact with a lower face of the upper cylindrical portion of the incinerator 14, and by locking a fixing clip (not shown) to a clip lock portion 16b provided on the chamber taking-in/out port 24 side and functioning also as a handle.

Figure 3:
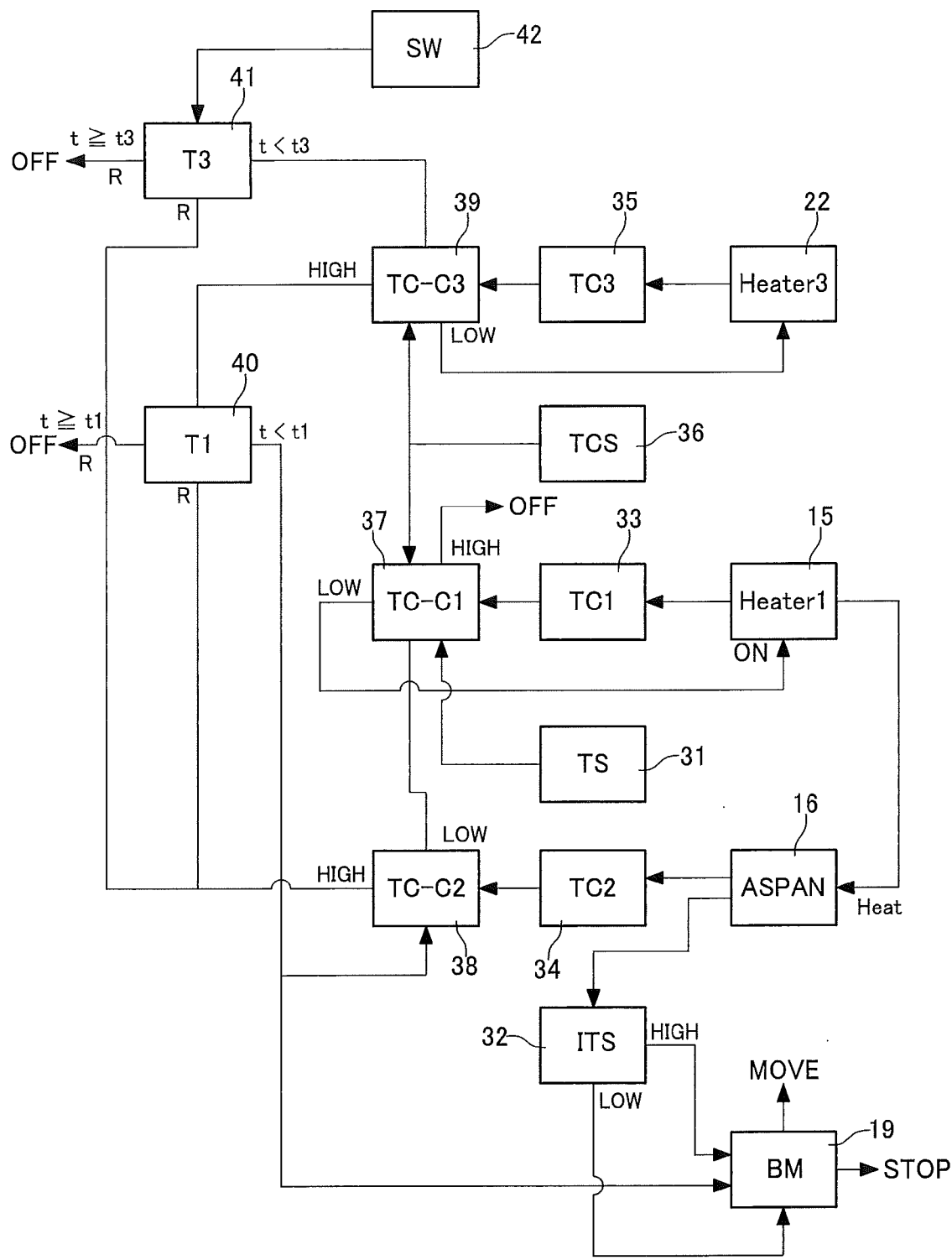
FIG. 3 is a block diagram showing an example of a control means.

Furthermore, the electric incinerating toilet bowl is provided with a control means 30 having a circuit configuration as shown in FIG. 3 so as to control the incinerating heater 15, the filler heating heater 22, and the exhaust blower 19. The control means 30 includes an incinerator lower portion temperature detector (TS) 31 for detecting a temperature of a lower portion of the incinerator 14, an incinerator upper portion temperature detector (ITS) 32 for detecting a temperature of an upper portion of the incinerator 14, an incinerating heater surface temperature detector (TC1) 33 for detecting a surface temperature of the incinerating heater 15, an incineration chamber temperature detector (TC2) 34 for detecting a bottom face temperature of the incineration chamber 16, a filler heating heater surface temperature detector (TC3) 35 for detecting a surface temperature of the filler heating heater 22, and an upper portion temperature detector (STS) 36 for detecting a temperature of an upper portion in the toilet bowl housing 11, and an incinerating heater controller (TC-C1) 37, an incineration treatment end controller (TC-C2) 38, and a filler heater controller (TC-C3) 39 for respectively controlling the incinerating heater 15, the filler heating heater 22, and the exhaust blower 19 based on the temperatures detected by the temperature detectors 31 to 36. Furthermore, an incinerating time control timer (T1) 40 and a filler heating time control timer (T3) 41 for controlling maximum operating times of the incinerating heater 15 and the filler heating heater 22 are provided.

The deodorizing catalyst filled portion 20 and the smoke and soot removing filler filled portion 21 are defined by partition members 20a and 21a such as metallic mesh and porous plates having an aeration property. The deodorizing catalyst filled portion 20 is filled with a platinum catalyst formed by supporting platinum or a palladium catalyst formed by supporting palladium by a carrier such as strong-acid zeolite, silica, activated alumina, titania, niobia, silica-alumina, and zirconia as a deodorizing catalyst A for decomposing odor components mainly including a nitrogen-based compound such as ammonia included in the burning exhaust gas. The deodorizing catalyst A can effectively remove the odor components such as ammonia included in the burning exhaust gas by coming in contact with the burning exhaust gas at a temperature lower than 350° C., preferably at a temperature not lower than 250° C. and lower than 350° C., and normally at a temperature around 300° C. Catalytic reaction does not proceed sufficiently, if the temperature of deodorizing catalyst is excessively low or high.

The smoke and soot removing filler filled portion 21 is filled with a smoke and soot removing filler B for removing carbon particles which are main components of smoke and soot generated when the paper liners burn in the incinerator 14 and for removing the odor components in the gas and the odor components adsorbed onto the carbon particles. The carbon particles included in the burning exhaust gas are heated to a high temperature when they pass through the layer filled with the smoke and soot removing filler heated to a high temperature not lower than 350° C. and preferably between 400 and 700° C., react with oxygen in the air, and turn into carbon dioxide. The odor components adsorbed onto the carbon particles are released from the carbon particles in oxidation reaction (burning) of the carbon and the released odor components decompose or react at a high temperature to thereby decompose the nitrogen-based components to nitrogen gas, carbon dioxide, and water, for example, and remove them from the burning exhaust gas. If the temperature of the smoke and soot removing filler is excessively low, sufficient oxidation reaction of the carbon particles cannot be obtained. If the temperature of the smoke and soot removing filler is excessively high, an excessive burden is placed on material forming the smoke and soot removing filler filled portion 21 and electrical consumption increases as well.

Therefore, as the smoke and soot removing filler, a substance having a function of facilitating the oxidation reaction of carbon and a function of removing the odor components needs to be used. As such material, it is possible to use various kids of ceramic such as zeolite, pearlite, vermilite, cordierite, and thermally-activated alumina and inorganic porous body such as zeolite and Kanuma soil, for example. Moreover, it is possible to use the porous body supporting noble metal such as platinum, palladium, gold, ruthenium, rhodium, and silver, metal such as copper, zinc, nickel, cobalt, iron, and titanium, or nitrite, chloride, and oxide of them to facilitate the oxidation reaction. It is also possible to use the platinum catalyst or the palladium catalyst filled in the deodorizing catalyst filled portion 20. These various substances may be used separately or a plurality of them may be mixed properly to be used.

A total amount of burning exhaust gas including burning gas generated by burning of the excrement and water vapor formed by vaporization of moisture varies depending on a treatment condition but may reach 1000 $cm^3/cm^2$ per second at maximum. The deodorizing catalyst filled portion 20 has a sectional area of 50 to 200 $cm^2$ and a length of 1 to 5 cm in a flowing direction in general and therefore the size of the smoke and soot removing filler filled portion 21 is limited by the sectional area of the deodorizing catalyst filled portion 20 and an available space for installation in the toilet bowl housing 11. Normally, the smoke and soot removing filler filled portion 21 is preferably provided adjacent to and downstream of the deodorizing catalyst filled portion 20 and therefore a sectional area of the smoke and soot removing filler filled portion 21 is set to be about the same as the sectional area of the deodorizing catalyst filled portion 20, i.e., in a range of 50 to 200 $cm^2$ and a length of the smoke and soot removing filler filled portion 21 is set to be in a range of 5 to 50 cm. However, in order to obtain an optimum gas retention time according to a condition of the smoke and soot removing filler filled in the smoke and soot removing filler filled portion 21, the smoke and soot removing filler filled portion 21 preferably has the sectional area of 80 to 180 $cm^2$ and the length of 6 to 30 cm and more preferably has the sectional area of 80 to 130 $cm^2$ and the length of 6 to 20 cm.

The deodorizing catalyst filled in the deodorizing catalyst filled portion 20 and the smoke and soot removing filler filled in the smoke and soot removing filler filled portion 21 both of which have suitable particle diameters are filled at suitable filling rates of 10 to 60%, for example, so that an appropriate degree of ventilation resistance can be obtained. For example, if the particle diameters are excessively small, contact areas with the burning exhaust gas are large while the ventilation resistance is large. If the particle diameters are excessively large, the contact areas with the burning exhaust gas are small and the ventilation resistance is small as well and therefore the retention time of the burning exhaust gas becomes too short to obtain the sufficient reaction.

After using of the electric incinerating toilet bowl formed as described above by opening a lid 12a of the toilet seat 12 and laying the suitable number of paper liners in the flushing bowl 13, the flushing bowl 13 and the incinerator cover 17 open synchronously by closing the lid 12a and stepping on the pedal, the excrement drops into the incineration chamber 16 with the paper liners, and the flushing bowl 13 and the incinerator cover 17 close to bring the incinerator 14 into a half-sealed state by releasing the pedal. Then, by turning on a treatment start switch (SW) 42 made up of a switch synchronized with the pedal or a switch provided independently, the control means 30 is actuated to control operation of the incinerating heater 15, the filler heating heater 22, and the exhaust blower 19 by a preset procedure to incinerate the excrement with the paper liners. The burning exhaust gas generated in the incineration treatment is subjected to a deodorizing treatment in the deodorizing catalyst filled portion 20 and subjected to a smoke and soot removing treatment in the smoke and soot removing filler filled portion 21 and exhausted outside from the toilet bowl housing 11 through the exhaust port 23.

If the control means 30 is actuated by throwing the treatment start switch 42, the filler heating time control timer 41 starts counting and the filler heater controller 39 starts energization of the filler heating heater 22 to actuate the filler heating heater (Heater 3) 22. The filler heater controller 39 controls energization of the filler heating heater 22 based on the detected temperature of the filler heating heater surface temperature detector 35 to heat the smoke and soot removing filler filled in the smoke and soot removing filler filled portion 21 to a preset temperature not lower than 350° C., e.g., a predetermined temperature in a range of 450 to 600° C. to prepare the smoke and soot removing filler for removal of the smoke and soot.

If the detected temperature of the filler heating heater surface temperature detector 35 rises to the preset temperature, the incinerating time control timer 40 starts counting and the incinerating heater controller 37 starts energization of the incinerating heater 15 to actuate the incinerating heater (Heater 1) 15. At the same time, a motor (BM) of the exhaust blower 19 is energized to actuate the exhaust blower 19 to carry out exhaust operation. The incinerating heater controller 37 controls energization of the incinerating heater 15 based on the detected temperature of the incinerating heater surface temperature detector 33 to control the incinerating heater surface temperature to a temperature not lower than 450° C. and preferably to a set temperature in a range of 500 to 600° C. After moisture in the excrement and the paper liners which have dropped in the incineration chamber 16 is vaporized by heating by radiation heat from the incinerating heater 15, burning of the paper liners and the excrement and thermal decomposition of organic matter start.

The burning exhaust gas (including water vapor) generated in the incinerator 14 by the burning treatment is drawn into the exhaust route 18 by suction of the exhaust blower 19 and passes through the deodorizing catalyst filled portion 20. The deodorizing catalyst filled in the deodorizing catalyst filled portion 20 comes in contact with the radiation heat from the smoke and soot removing filler filled portion 21 and the incinerating heater 15 and the high-temperature burning exhaust gas and, as a result, it is heated to a temperature about 250 to 350° C. and normally about 300° C. and becomes stable. When the odor components in the burning exhaust gas come in contact with the deodorizing catalyst which has been heated to about 300° C., the odor components such as nitrogen compounds are decomposed into nitrogen and water by catalyst action of the deodorizing catalyst and removed from the exhaust gas.

On the other hand, if the electric incinerating toilet bowl is used frequently and the temperatures of solid matter and the paper liners and especially the temperature of the paper liners exceeds 300° C., the paper liners may spontaneously ignite and burn furiously with flame in some cases. If the paper liners burn furiously with flame, smoke and soot are generated by the burning and drawn into the exhaust route 18 with the normal burning exhaust gas. Because the smoke and soot can hardly be removed by the deodorizing catalyst filled in the deodorizing catalyst filled portion 20, the smoke and soot pass through the deodorizing catalyst filled portion 20 and flow into the smoke and soot removing filler filled portion 21 provided adjacent to and downstream of the deodorizing catalyst filled portion 20. By taking certain time to pass through the smoke and soot removing filler heated to a predetermined temperature not lower than 350° C. in the smoke and soot removing filler filled portion 21, carbon particles which are a main component of the smoke and soot in the burning exhaust gas react with oxygen and turn into carbon dioxide and the carbon particles which cause the smoke and soot are removed from the burning exhaust gas.

The odor components adhering to or adsorbed onto the carbon particles in the smoke and soot are released from the carbon particles when the carbon particles burn and the odor components are removed from the burning exhaust gas by thermally decomposing or reacting with oxygen in a high-temperature atmosphere in the smoke and soot removing filler layer. Moreover, carbon monoxide generated in the burning is oxidized in the deodorizing catalyst filled portion 20 and the smoke and soot removing filler filled portion 21 and turns into carbon dioxide.

The burning exhaust gas treated in the deodorizing catalyst filled portion 20 and the smoke and soot removing filler filled portion 21 is drawn into the exhaust blower 19 with air in the toilet bowl housing 11 and the high-temperature burning exhaust gas and outside air are mixed with each other and exhausted from the exhaust port 23. Therefore, by appropriately setting mixing ratios of the burning exhaust gas and air drawn into the exhaust blower 19, it is possible to lower a temperature of the exhaust from the exhaust port 23 to a safe temperature not higher than 50° C., for example. Because there is a negative pressure in the toilet bowl housing 11, the burning exhaust gas does not leak outside and air (oxygen) required for the burning treatment and the oxidation reaction can be taken into the incinerator 14.

Such incineration ends, if the incineration treatment end controller 38 cuts off energization of the incinerating heater 15 through the incinerating heater controller 37 when the bottom face temperature (ASPAN) of the incineration chamber 16 detected by the incineration chamber temperature detector 34 rises to a preset temperature not lower than 100° C. The bottom face temperature of the incineration chamber 16 does not exceed 100° C. at atmospheric pressure on plains while the moisture is remaining in the incineration chamber 16 and a temperature in the incineration chamber 16 rises to 100° C. or higher after the moisture has completely vaporized from inside the incineration chamber 16. Moreover, because it takes time for heat to be transferred from an inner face to the bottom face (outer face) of the incineration chamber 16 having a heat insulating structure, it is possible to reliably carry out the incineration treatment of the excrement in the incineration chamber 16 by ending the incineration treatment after detecting the rise of the bottom face temperature to 100° C. or higher. By providing the heat insulating portion 25 on the bottom face of the toilet bowl housing 11 and biasing the incineration chamber 16 upward by the leaf spring 14c away from the heat insulating portion 25, it is possible to detect the bottom face temperature of the incineration chamber 16 more accurately.

Moreover, if the electric incinerating toilet bowl is used frequently or not sufficiently maintained, the moisture or the like may adhere with a core of an unburned fine carbon particle to form a tarry substance which may adhere to the inner face and the like of the incineration chamber 16. Although the tarry substance can be removed by periodically cleaning the incineration chamber 16 and carrying out boiling without water by the incinerating heater 15, a large amount of tarry substance adheres and part of the tarry substance flows into the exhaust route 18 to adversely affect the catalyst and the like, corrode members, or short-circuit electric wiring, if appropriate maintenance is not carried out.

Therefore, so as to be able to incinerate the tarry substance remaining in the incineration chamber 16 in the same manner as in the boiling without water after the moisture in the incineration chamber 16 has completely vaporized, the incinerating heater 15 is stopped when the bottom face temperature of the incineration chamber 16 rises to a preset temperature not lower than 100° C., preferably not lower than 120° C., and more preferably not lower than 150° C. In this way, even if the tarry substance is remaining in the incineration chamber 16 in each incineration treatment, it is possible to prevent a long-period of boiling without water by stopping the heater after completely treating the water. As a result, temperatures of respective portions of the electric incinerating toilet bowl and the installation environment do not rise excessively to thereby suppress thermal deterioration of the incinerator 14 and useless consumption of electric power. Moreover, by adjusting the incinerating heater 15 to stop after the bottom face temperature of the incineration chamber 16 has reached 180 to 250° C., the tarry substance and carbide in the incineration chamber 16 can be completely treated and only odorless and sterile ash such as sodium chloride crystals can be left in the incineration chamber 16.

Moreover, even if the electric incinerating toilet bowl is used excessively frequently and the transient time period for which the water vapor, the tarry substance, and the smoke and soot exist together inside the incinerator 14 becomes long in the incineration treatment and if the condensation of the moisture occurs in the toilet bowl housing 11, it is possible to prevent deposition of the smoke and soot and the tarry substance and the electrical failures of terminals of the temperature detectors and the current controller by incinerating the tarry substance and removing the smoke and soot in the smoke and soot removing filler filled portion 21 as described above.

At the same time as the cutting off of the energization of the incinerating heater 15, the energization of the filler heating heater 22 is cut off and the incinerating time control timer 40 and the filler heating time control timer 41 are reset to end the incineration treatment while the energization of the exhaust blower 19 is continued to carry out cooling operation for cooling the respective portions of the electric incinerating toilet bowl down to appropriate temperatures. This cooling operation is continued until the temperature of the upper portion of the incinerator 14 which is high during the incineration treatment drops to a preset exhaust end temperature, e.g., a temperature not higher than 80° C. at which a hand which touches the portion does not get burnt and preferably to a temperature not higher than 55° C. when the temperature is detected by the incinerator upper portion temperature detector 32.

On the other hand, in order to prevent excessive rises of the temperatures of the respective portions of the electric incinerating toilet bowl and especially an ambient temperature of the toilet seat 12 by the incinerating heater 15 and the filler heating heater 22 operating continuously, the energization of the incinerating heater 15, the exhaust blower 19, and the filler heating heater 22 is automatically cut off when times respectively set on the incinerating time control timer 40 and the filler heating time control timer 41 have elapsed. Preferably, the times set on these timers are set to such times as to be able to reliably incinerate the excrement when the incineration chamber 16 is filled with the excrement and reliably remove the generated smoke and soot, e.g., the time for which urine filled in the incineration chamber 16 can be vaporized completely is set on the incinerating time control timer 40 and the time which is longer than that on the incinerating time control timer 40 and for which the smoke and soot generated when the burning by residual heat after stopping the operation of the incinerating heater 15 is continued can be removed is set on the filler heating time control timer 41.

Furthermore, as safety measures, the energization of the incinerating heater 15 is set to be cut off and the exhaust blower 19 is operated continuously to draw outside air into the toilet bowl housing 11 when the detected temperature of the upper portion temperature detector 36 has reached a preset temperature, e.g., 60° C. or higher. Similarly, the incinerating heater 15 is stopped to prevent an ambient temperature of the incinerator 14 from becoming high when the detected temperature of the incinerator lower portion temperature detector 31 has reached a preset temperature, e.g., 150° C. or higher. In this way, it is possible to prevent the excessive rises of the temperatures of the respective portions of the electric incinerating toilet bowl and accidents such as a burn suffered by a user sitting on the toilet seat 12.

As described above, by starting the energization of the incinerating heater 15 and the energization of the exhaust blower 19 after the smoke and soot removing filler filled in the smoke and soot removing filler filled portion 21 is heated to a preset temperature not lower than 350° C. by the filler heating heater 22 in carrying out the incineration treatment of the excrement and the paper liners after evacuation, the smoke and soot removing filler filled portion 21 can remove the smoke and soot even if the smoke and soot which cannot be removed by the deodorizing catalyst are generated during the incineration treatment. Therefore, it is possible to prevent leakage of the smoke and soot out of the electric incinerating toilet bowl. As a result, even if the electric incinerating toilet bowl is installed indoors and especially in an underground construction space, a basement and a shield tunnel construction site, the smoke and soot do not fill the room to pollute the environment, which widens a range of use of the electric incinerating toilet bowl.

Because the deodorizing catalyst filled in the deodorizing catalyst filled portion 20 can be heated by heat of the smoke and soot removing filler heated by the filler heating heater 22, the temperature of the deodorizing catalyst can be risen to some degree by the time of the start of the incineration treatment and therefore the odor components can be removed effectively by the deodorizing catalyst. Moreover, a substance having a function as a deodorizing catalyst may be mixed into the filler filled in the smoke and soot removing filler filled portion 21 or a substance having both the smoke and soot removing function and the deodorizing catalyst function may be used as the filler to thereby carry out the removal of the odor components while removing the smoke and soot.

By ending the energization of the incinerating heater 15 based on the temperature of the incineration chamber 16, the excrement in the incineration chamber 16 can be incinerated reliably, the tarry substance can be prevented from remaining in the incineration chamber 16, and a burden of maintenance can be reduced. By controlling the maximum operating times of the respective heaters by using the timers, it is possible to reduce electrical consumption while reliably carrying out the incineration treatment of the excrement and the rises of the temperatures of the electric incinerating toilet bowl and an installation site can be suppressed.

The temperature detecting positions of the respective temperature detectors can be set arbitrarily, if the temperatures of the objects can be detected in controllable states and the respective temperature set values can be set to optimum temperatures according to the measuring positions. Moreover, structures of details of the electric incinerating toilet bowl can be changed suitably according to the expected maximum use frequency and the like.

EXAMPLE 1

By using the electric incinerating toilet bowl having the structure shown in FIG. 1, an incineration treatment of excrement was carried out. Specifications of main portions are as follows. A capacity of the incineration chamber 16 was about 2 liters, the incinerator 14 was in a cylindrical shape having an outer diameter of 290 mm, a heater capacity was 1500 W and a preset temperature was 540° C. in the incinerating heater 15, the deodorizing catalyst filled portion 20 was in an arc shape along an incinerator body and having a width of 125 mm, a height of 68 mm, and a thickness of 12 mm, the deodorizing catalyst was a commercially available deodorizing catalyst having a surface treated with platinum palladium and a filled amount of the deodorizing catalyst was 110 $cm^3$, an exhaust capacity of the exhaust blower 19 was 2 $m^3$ per minute, the smoke and soot removing filler filled portion 21 was in a rectangular cylindrical shape having a width of 130 mm, a height of 72 mm, and a length of 160 mm, a heater capacity was 300 W and a preset temperature was 450° C. in the filler heating heater 22, the smoke and soot removing filler was the same palladium catalyst as the deodorizing catalyst and a filled amount of the smoke and soot removing filler was 1300 $cm^3$, an incineration treatment end preset temperature of the incineration chamber temperature detector 34 was 120° C., and an exhaust blower stop preset temperature of the incinerator upper portion temperature detector 32 was 54° C.

500 g of urine was dropped with three paper liners into the incineration chamber 16 and the treatment start switch 42 was thrown to start the incineration treatment. The detected temperature of the filler heating heater surface temperature detector 35 exceeded 450° C. in eighteen minutes after the start of the energization of the filler heating heater 22 and the filler heater controller 39 started ON/OFF control of the filler heating heater 22. At the same time, the incinerating heater controller 37 started the energization of the incinerating heater 15 and a blower controller 38 actuated the exhaust blower 19. In 52 minutes after the start of the energization of the incinerating heater 15, the detected temperature of the incineration chamber temperature detector 34 rose to 120° C., the energization of the filler heating heater 22 and the incinerating heater 15 was cut off, and the incineration treatment ended. The bottom face temperature of the incineration chamber 16 rose even after the end of the energization of the incinerating heater 15 and reached the maximum temperature of 173° C. in five minutes. The exhaust blower 19 stopped when the detected temperature of the incinerator upper portion temperature detector 32 dropped to 80° C.

During the period between the start and the end of the treatment, the gas exhausted from the exhaust port 23 was almost odorless and no smoke was observed. The maximum temperature of the exhaust gas was 40° C. Furthermore, only a small amount of ash was remaining and no tarry substance was observed in the incineration chamber 16.

On the other hand, if the incinerating heater 15 and the exhaust blower 19 were actuated by throwing of the treatment start switch 42 on the same condition except that the filler heating heater 22 was stopped and that the smoke and soot removing filler was not heated, gas and smoke having an ammonia odor and a burnt odor were exhausted from the exhaust port 23 for a few minutes until the temperature of the deodorizing catalyst rose.

EXAMPLE 2

An experiment was carried out on the assumption that an adult continually uses the electric incinerating toilet bowl having the same specifications as those in the example 1 for a week. The preset temperature of the filler heating heater 22 was 560° C. and a residue in the incineration chamber 16 was disposed of once every time. As a result, the time required for the incineration treatment was about ninety-five minutes on average and the gas exhausted from the exhaust port 23 during the incineration treatment included almost no odor and smoke and soot. After the experiment, the electric incinerating toilet bowl was disassembled, the inside of the toilet bowl housing 11 was observed, and the inside was little soiled and no tarry substance adhering to the exhaust route 18 and the inside of the exhaust blower 19 through which the burning exhaust gas passed was observed.

EXAMPLE 3

An experiment was carried out by using an electric incinerating toilet bowl in which a capacity of the incineration chamber 16 was about 3 liters, an outer diameter of the incinerator 14 was 310 mm, a heater capacity was 2800 W and a preset temperature was 570° C. in the incinerating heater 15, the deodorizing catalyst filled portion 20 had a width of 130 mm, a height of 72 mm, and a thickness of 12 mm, the deodorizing catalyst was a commercially available palladium catalyst, a filled amount of the deodorizing catalyst was 110 $cm^3$, an exhaust capacity of the exhaust blower 19 was 4 $m^3$ per minute, the smoke and soot removing filler filled portion 21 had a width of 130 mm, a height of 72 mm, and a length of 160 mm, a heater capacity was 450 W and a preset temperature was 590° C. in the filler heating heater 22, the smoke and soot removing filler was commercially available zeolite A049, a filled amount of the smoke and soot removing filler was 1300 $cm^3$ (about 750 g), an incineration treatment end preset temperature of the incineration chamber temperature detector 34 was 150° C., an exhaust blower stop preset temperature of the incinerator upper portion temperature detector 32 was 54° C., and the deodorizing catalyst filled portion 20 and the smoke and soot removing filler filled portion 21 were connected with a space of 10 mm provided therebetween. A basic structure of the electric incinerating toilet bowl was the same as that of the electric incinerating toilet bowl used in the example 1.

1476 g of urine and 524 g of stool were dropped with ten paper liners into the incineration chamber 16 and the incineration treatment was started. The surface temperature of the filler heating heater 22 rose to 590° C. in fifteen minutes after the start and the incinerating heater 15 and the exhaust blower 19 started operation. Then, in thirteen minutes, the surface temperature of the incinerating heater 15 reached 570° C. For a while after the start of the operation of the incinerating heater 15 and the exhaust blower 19, a faint ammonia odor was felt from gas exhausted from the exhaust port 23 because of the large amount of urine, but the odor was not so strong as to provide an unpleasant feeling. Although no exhaust of smoke was observed, damp due to vaporization of the moisture was felt. In ninety minutes, the bottom face temperature of the incineration chamber 16 rose to 150° C. and the incineration treatment was finished. Then, in ten minutes, the detected temperature of the incinerator upper portion temperature detector 32 dropped to 80° C. and the exhaust blower 19 stopped.

When the similar incinerating treatment was carried out without operating the filler heating heater 22, a large amount of smoke caused by burning of the paper liners was exhausted because of the large number of paper liners and, at the same time, a strong ammonia odor was felt.

EXAMPLE 4

An experiment was carried out by using an electric incinerating toilet bowl in which a capacity of the incineration chamber 16 was about 3 liters, an outer diameter of the incinerator 14 was 310 mm, a heater capacity was 2800 W and a preset temperature was 570° C. in the incinerating heater 15, the deodorizing catalyst filled portion 20 had a width of 180 mm, a height of 100 mm, and a thickness of 24 mm, the deodorizing catalyst was a commercially available palladium catalyst, a filled amount of the deodorizing catalyst was 450 $cm^3$, an exhaust capacity of the exhaust blower 19 was 4 $m^3$ per minute, the smoke and soot removing filler filled portion 21 had a width of 180 mm, a height of 100 mm, and a length of 160 mm, an outlet opening of the smoke and soot removing filler filled portion 21 had a width of 160 mm and a height of 80 mm, a heater capacity was 500 W and a preset temperature was 580° C. in the filler heating heater 22, the smoke and soot removing filler was a mixed filler prepared by uniformly mixing 1200 $cm^3$ of commercially available zeolite A049 and 1100 $cm^3$ of the same deodorizing catalyst as that in the example 1, an incineration treatment end preset temperature of the incineration chamber temperature detector 34 was 150° C., an exhaust blower stop preset temperature of the incinerator upper portion temperature detector 32 was 54° C., and the deodorizing catalyst filled portion 20 and the smoke and soot removing filler filled portion 21 were connected with a space of 30 mm provided therebetween. A basic structure of the electric incinerating toilet bowl was the same as that of the electric incinerating toilet bowl used in the example 1.

575 g of urine and 425 g of stool were dropped with seven paper liners into the incineration chamber 16 and the incineration treatment was started. The surface temperature of the filler heating heater 22 rose to 580° C. in fifteen minutes after the start and the incinerating heater 15 and the exhaust blower 19 started operation. Then, in fourteen minutes, the surface temperature of the incinerating heater 15 reached 570° C. In sixty-four minutes after the start of the operation of the incinerating heater 15 and the exhaust blower 19, the bottom face temperature of the incineration chamber 16 rose to 150° C. and the incineration treatment was finished. Then, in ten minutes, when the detected temperature of the incinerator upper portion temperature detector 32 dropped to 80° C., the exhaust blower 19 stopped. During the incineration treatment, an ammonia odor and smoke were not felt at all from gas exhausted from the exhaust port 23.

Each of the electric incinerating toilet bowls in the respective examples was installed in a room having a six-mat area and a similar experiment of the incineration treatment was carried out. Although humidity in the room rose while moisture of urine was being vaporized and a room temperature rose a little as the incineration treatment proceeds, the rises were not so significant as to provide an unpleasant feeling and it was possible to maintain the same level of environment as a normal living space.

EXPLANATION OF REFERENCE NUMERALS

11 . . . toilet bowl housing, 12 . . . toilet seat, 12*a* . . . lid, 13 . . . flushing bowl, 14 . . . incinerator, 14*a* . . . opening, 14*b* . . . lock lug, 14*c* . . . leaf spring, 15 . . . incinerating heater, 16 . . . incineration chamber, 16*a* . . . flange portion, 16*b* . . . clip lock portion, 17 . . . incinerator cover, 18 . . . exhaust route, 19 . . . exhaust blower, 20 . . . deodorizing catalyst filled portion, 20*a* . . . partition member, 21 . . . smoke and soot removing filler filled portion, 21*a* . . . partition member, 22 . . . filler heating heater, 23 . . . exhaust port, 24 . . . chamber taking-in/out port, 25 . . . heat insulating portion, 30 . . . control means, 31 . . . incinerator lower portion temperature detector (TS), 32 . . . incinerator upper portion temperature detector (ITS), 33 . . . incinerating heater surface temperature detector (TC1), 34 . . . incineration chamber temperature detector (TC2), 35 . . . filler heating heater surface temperature detector (TC3), 36 . . . upper portion temperature detector (STS), 37 . . . incinerating heater controller (TC-C1), 38 . . . incineration treatment end controller (TC-C2), 39 . . . filler heater controller (TC-C3), 40 . . . incinerating time control timer (T1), 41 . . . filler heating time control timer (T3), 42 . . . treatment start switch (SW), A . . . deodorizing catalyst, B . . . smoke and soot removing filler

The invention claimed is:

1. An electric incinerating toilet bowl comprising:
a housing having an insulating portion on a bottom face thereof;
a flushing bowl provided below a toilet seat and having a bottom which can be opened and closed;
an incineration chamber provided below the flushing bowl;
an incinerating heater for heating and incinerating excrement with a paper liner dropped from the flushing bowl into the incineration chamber;
an exhaust blower for exhausting burning exhaust gas generated in the incineration chamber outside from the incineration chamber through an exhaust route;
a biasing member operatively disposed between the insulating portion and a bottom face of the incineration chamber and configured to bias the incineration chamber away from the insulating portion; and
a control means that controls an operation of the electric incinerating toilet bowl, including a plurality of temperature detectors disposed in or around the electric incinerating toilet bowl, wherein
i) a deodorizing catalyst filled portion filled with a deodorizing catalyst that comes into contact with the burning exhaust gas, the deodorizing catalyst being at a temperature lower than 350° C., ii) a smoke and soot removing filler filled portion filled with a smoke and soot removing filler that comes into contact with the burning exhaust gas, the smoke and soot removing filler being at a temperature not lower than 350° C., and iii) a filler heating heater that is positioned inside the smoke and soot removing filler filled portion and heats the smoke and soot removing filler, are provided in the exhaust route,
the smoke and soot removing filler filled portion is positioned adjacent to the deodorizing catalyst filled portion and downstream of the deodorizing catalyst filled portion, with respect to a flow direction of the burning exhaust gas, and
the control means controls the incinerating heater, the exhaust blower, and the filler heating heater based on temperatures detected by the plurality of temperature detectors.

2. The electric incinerating toilet bowl according to claim 1, wherein the smoke and soot removing filler filled portion has a length in a range of 5 to 50 cm in a gas flowing direction and a sectional area in a range of 50 to 200 cm$^2$.

3. The electric incinerating toilet bowl according to claim 1, wherein the control means causes the electric incinerating toilet bowl to:
heat the smoke and soot removing filler to a preset smoke and soot removing temperature not lower than 350° C. by actuating the filler heating heater in response to input of a treatment start signal;
carry out an incineration treatment by actuating the incinerating heater and the exhaust blower when the temperature of the smoke and soot removing filler has risen to the smoke and soot removing temperature;
stop the incinerating heater and the filler heating heater when the bottom face temperature of the incineration chamber has risen to a preset incineration treatment end temperature; and
stop the exhaust blower when a temperature in the electric incinerating toilet bowl has dropped to a preset exhaust end temperature after the stop of the incinerating heater.

4. The electric incinerating toilet bowl according to claim 3, wherein each of the incinerating heater and the filler heating heater stops operation when a time from the start of the operation has exceeded a preset time required to burn the maximum amount of excrement which is accommodated in the incineration chamber.

5. The electric incinerating toilet bowl according to claim 3, wherein a surface temperature of the incinerating heater is controlled in a range of 500 to 600° C.

6. The electric incinerating toilet bowl according to claim 3, wherein the incineration treatment end temperature is set in a range of 100 to 250° C.

7. The electric incinerating toilet bowl according to claim 2, wherein the control means causes the electric incinerating toilet bowl to:
heat the smoke and soot removing filler to a preset smoke and soot removing temperature not lower than 350° C. by actuating the filler heating heater in response to input of a treatment start signal;
carry out an incineration treatment by actuating the incinerating heater and the exhaust blower when the temperature of the smoke and soot removing filler has risen to the smoke and soot removing temperature;
stop the incinerating heater and the filler heating heater when the bottom face temperature of the incineration chamber has risen to a preset incineration treatment end temperature; and
stop the exhaust blower when a temperature in the electric incinerating toilet bowl has dropped to a preset exhaust end temperature after the stop of the incinerating heater.

8. The electric incinerating toilet bowl according to claim 7, wherein each of the incinerating heater and the filler heating heater stops operation when a time from the start of the operation has exceeded a preset time required to burn the maximum amount of excrement which is accommodated in the incineration chamber.

9. The electric incinerating toilet bowl according to claim 7, wherein a surface temperature of the incinerating heater is controlled in a range of 500 to 600° C.

10. The electric incinerating toilet bowl according to claim 4, wherein a surface temperature of the incinerating heater is controlled in a range of 500 to 600° C.

11. The electric incinerating toilet bowl according to claim 8, wherein a surface temperature of the incinerating heater is controlled in a range of 500 to 600° C.

12. The electric incinerating toilet bowl according to claim 7, wherein the incineration treatment end temperature is set in a range of 100 to 250° C.

13. The electric incinerating toilet bowl according to claim 4, wherein the incineration treatment end temperature is set in a range of 100 to 250° C.

14. The electric incinerating toilet bowl according to claim 8, wherein the incineration treatment end temperature is set in a range of 100 to 250° C.

15. The electric incinerating toilet bowl according to claim 5, wherein the incineration treatment end temperature is set in a range of 100 to 250° C.

16. The electric incinerating toilet bowl according to claim 9, wherein the incineration treatment end temperature is set in a range of 100 to 250° C.

17. The electric incinerating toilet bowl according to claim 10, wherein the incineration treatment end temperature is set in a range of 100 to 250° C.

18. The electric incinerating toilet bowl according to claim 11, wherein the incineration treatment end temperature is set in a range of 100 to 250° C.

19. The electric incinerating toilet bowl according to claim 1, wherein the biasing member is a spring disposed in a gap defined between an outer face of the incineration chamber and the insulating portion, and the control means is configured to detect temperature of the outer face via one of the plurality of temperature detectors.

* * * * *